United States Patent [19]

Satoh

[11] Patent Number: 4,783,835
[45] Date of Patent: Nov. 8, 1988

[54] METHOD OF CHARACTER RECOGNITION

[75] Inventor: Koji Satoh, Osaka, Japan

[73] Assignee: Sumitomo Electric Industries, Ltd., Osaka, Japan

[21] Appl. No.: 142,353

[22] Filed: Dec. 28, 1987

Related U.S. Application Data

[63] Continuation of Ser. No. 894,075, Aug. 5, 1986, abandoned, which is a continuation of Ser. No. 669,635, Nov. 7, 1984, abandoned.

[30] Foreign Application Priority Data

Nov. 9, 1983 [JP] Japan ................................ 58-211374

[51] Int. Cl.$^4$ .............................................. G06K 9/20
[52] U.S. Cl. .................................... 382/48; 382/20; 382/59
[58] Field of Search ................... 382/20, 23, 25, 39, 382/48, 59

[56] References Cited

U.S. PATENT DOCUMENTS

| | | | |
|---|---|---|---|
| 3,303,463 | 2/1967 | Hamburgen | 382/40 |
| 4,180,800 | 12/1979 | Isshiki et al. | 382/20 |
| 4,193,056 | 3/1980 | Morita et al. | 382/25 |
| 4,355,301 | 10/1982 | Isshiki et al. | 382/20 |
| 4,561,106 | 12/1985 | Yoshida et al. | 382/25 |

Primary Examiner—Leo H. Boudreau
Assistant Examiner—Jose L. Couso
Attorney, Agent, or Firm—Jordan B. Bierman

[57] ABSTRACT

An improved apparatus and method of recognizing a character is disclosed. The side frame structures of characters or figures are discriminated by left and right margin detectors and corresponding left and right side frame recognition circuits. A final character discrimination circuit synthesized both the results of a conventional character recognition unit and the frame recognition circuits, and permits discrimination between similarly shaped characters.

18 Claims, 5 Drawing Sheets

METHOD OF CHARACTER RECOGNITION

This application is a continuation of application Ser. No. 894,075, filed Aug. 5, 1986, now abandoned, which is a continuation of Ser. No. 664,635, Nov. 7, 1984, abandoned.

FIELD OF THE INVENTION

This invention relates to an improved apparatus and method of automatic recognition of a character and, more specifically, of more precise recognition of a character by discriminating the frame-construction of the character to be recognized.

The invention is especially suitable for a hand-held optical character reading equipment or its combination with a bar-code reader or the like.

DESCRIPTION OF THE PRIOR ART

A character or alphanumeric figure (hereafter referred to as a character) is recognized by scanning with an image sensor having a two-dimensional array of photoelectric elements.

For example, a method of recognizing characters is disclosed in U.S. Pat. No. 4,180,800 wherein, as illustrated in FIG. 1 herein, characters on a sheet of paper 3 are scanned by a hand-held scanner 1 which is equipped with illuminating lamps 4, an optical lens 5, an image sensor 6 with a two-dimensional array of photoelectric cells, and a converter 7 for converting video output signals into digital signals representing a binary character pattern, as shown in FIG. 2 herein.

The character recognition method of U.S. Pat. No. 4,180,800 includes the step of determining the character area of the digitized pattern of the character by a vertical segmentation circuit 9 and a horizontal segmentation circuit 10. For instance, circuit 9 detects that the character "2" in FIG. 2 exists in the cells from line Lj to line Lj+N−1, and similarly circuit 10 determines that the character exists in the columns ranging from B1 to Bi in whole or at least in part.

The line features of the lines within the character area are then extracted by circuit 11. The features of the lines are classified and coded for all line segments of the character by a feature classification code. The line feature codes Ci may be compressed into partial feature codes Di, for example, by combining adjacent lines with the same feature classification code Ci into one partial code Di. The identity of the pattern is then determined by recognition circuit 13 by tracing the order of occurrence of partial feature codes Di through a predetermined decision network.

One problem to the above-described conventional method of character recognition is that only a limited number of characters can be reliably read, since there are a liited number of line feature criteria which can be discriminated when a practical scanning rate is desired. For example, in the prior method, all numerals plus a limited number of alphabetical characters in Font-B can be recognized. However, the numeral "8" cannot be distinguished from the character "B", and "K" is recognized to be similar to "X". Thus, conventional hand-held optical character readers (OCR) can recognize reliably the numerals and only about 10 alphabets.

It is possible to provide conventional OCR with additional functions to make it capable of distinguishing more characters, for example, by extracting more precise character line features. However, this results in a higher cost of the equipment due to the need for an increased capacity of read-only memory (ROM) in the recognizing circuit 13 and in the other circuits 11 and 12.

Accordingly, an object of the present invention is to eliminate the above-described difficulties which are inherent in the conventional methods of character recognition. More specifically, an object of the invention is to provide an improved apparatus and method of character recognition in which the function of recognizing character-frame construction is provided in order to allow more precise recognition of more characters than in the conventional methods.

SUMMARY OF THE INVENTION

In accordance with the present invention, an improved apparatus and method of character recognition enable discrimination of more characters by incorporating an additional function for discriminating the structure of the frame of the character. Discrimination of the frame is carried out by means of left and right margin detecting circuits and left and right side frame recognizing circuits. The recognized frame information is processed according to a predetermined decision network. The final character recognition is then obtained by synthesizing the outcome of discriminating both the line features of the character and its frame construction.

BRIEF DESCRIPTION OF THE DRAWINGS

The above objects and further features and advantages of the present invention will be described in detail with reference to the drawings, in which.

DESCRIPTION OF THE PREFERRED EMBODIMENT

Figure 1:
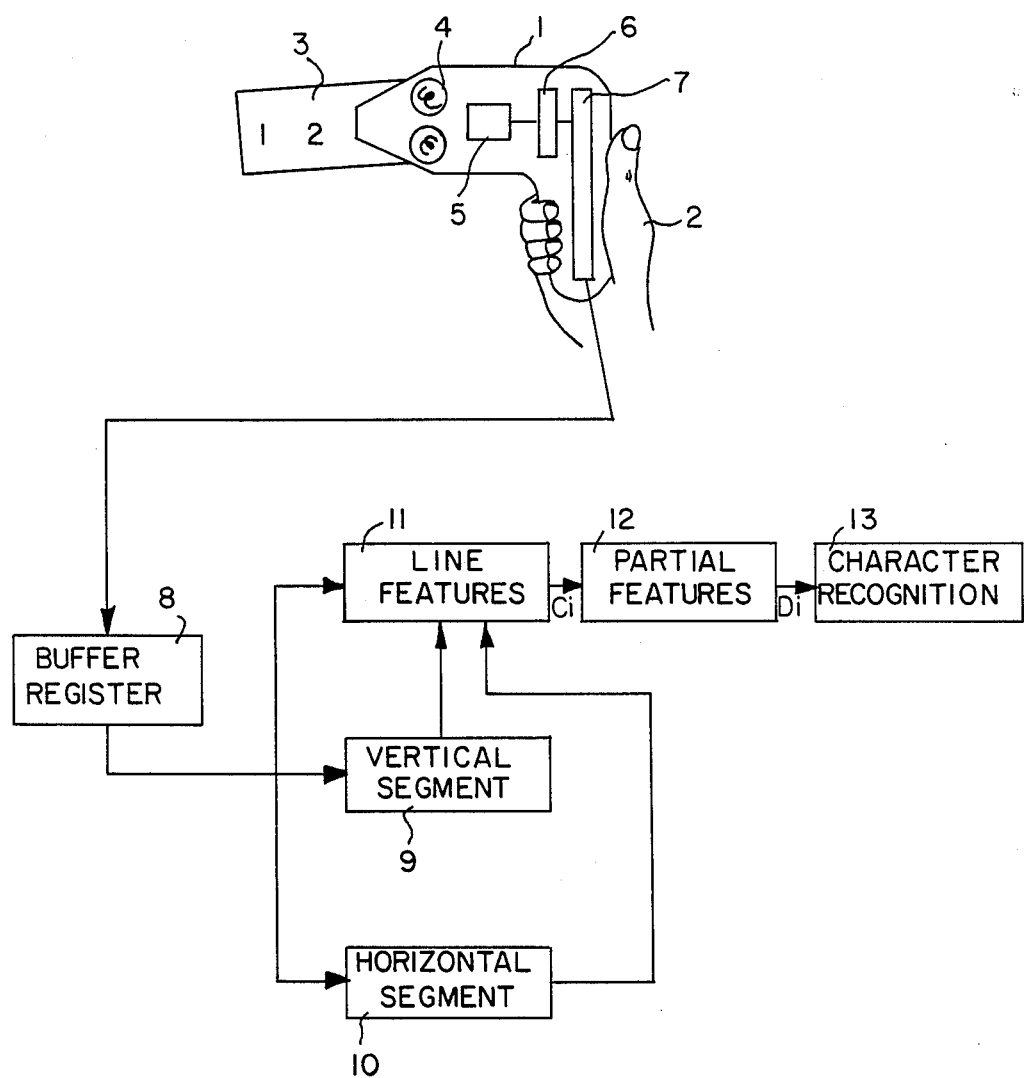
FIG. 1 is a block diagram illustrating a conventional character recognition device.
Figure 3:
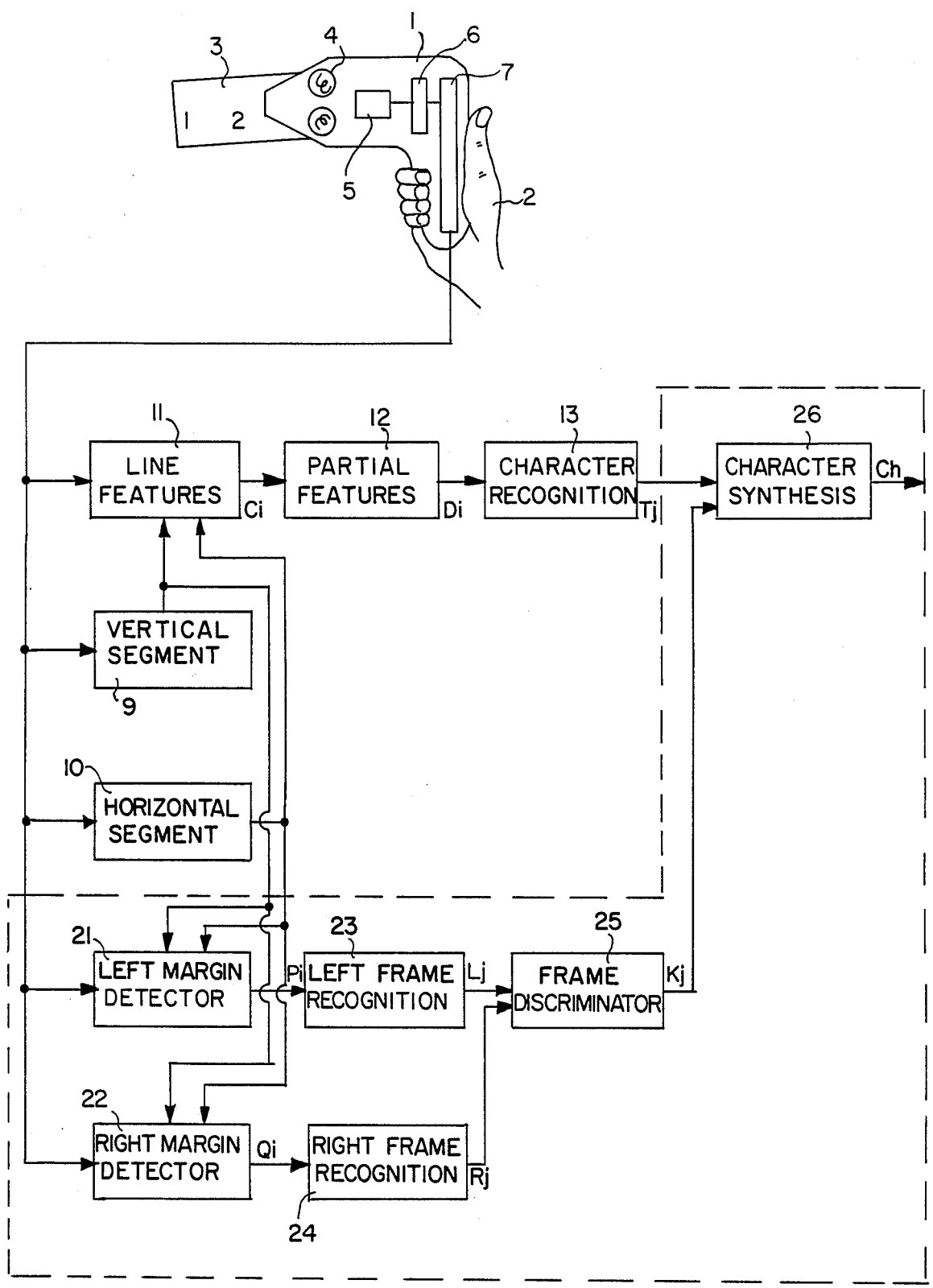
FIG. 3 is a block diagram of one embodiment of an improved character recognition apparatus according to the present invention.

In accordance with a preferred embodiment of the invention, FIG. 3 depicts a hand-held OCR scanner having similar components as referenced by numerals 1–13 of the conventional scanner described with respect to FIG. 1 above. The functioning of these conventional elements is considered to be known, for example, as disclosed in U.S. Pat. No. 4,180,800. In FIG. 3, left-margin detecting circuit 21 detects the presence of left-margin elements for each line segment of the binary pattern. The output signals Pi from the circuit 21 indicate the specific ones of the photoelectric elements detected in the left margin of the character.

Figure 2:
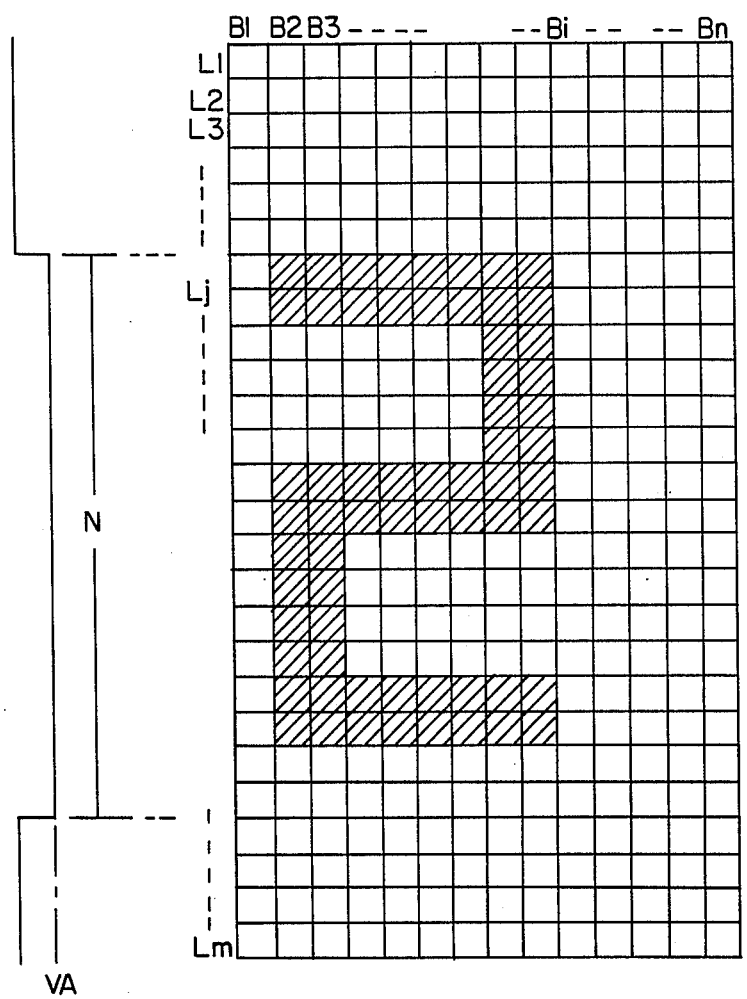
FIG. 2 is a diagram of a typical binary pattern for the character "2" obtained by an image sensor having a two-dimensional array of photoelectric cells.

In the case of the binary pattern "2" in FIG. 2, for example, the left margin of the pattern segment on the line Lj is detected by the photoelectric element in the column numbered B2. Accordingly, an output signal from circuit 21 for this line Lj is "P2". As the left-margin detecting circuit 21 receives the signals indicating the character area which is outputted from the vertical segmentation circuit 9 and horizontal segmentation circuit 10, the circuit 21 detects the presence of left-margin segments of the pattern "2" throughout the lines in the corresponding character area.

Figure 4:
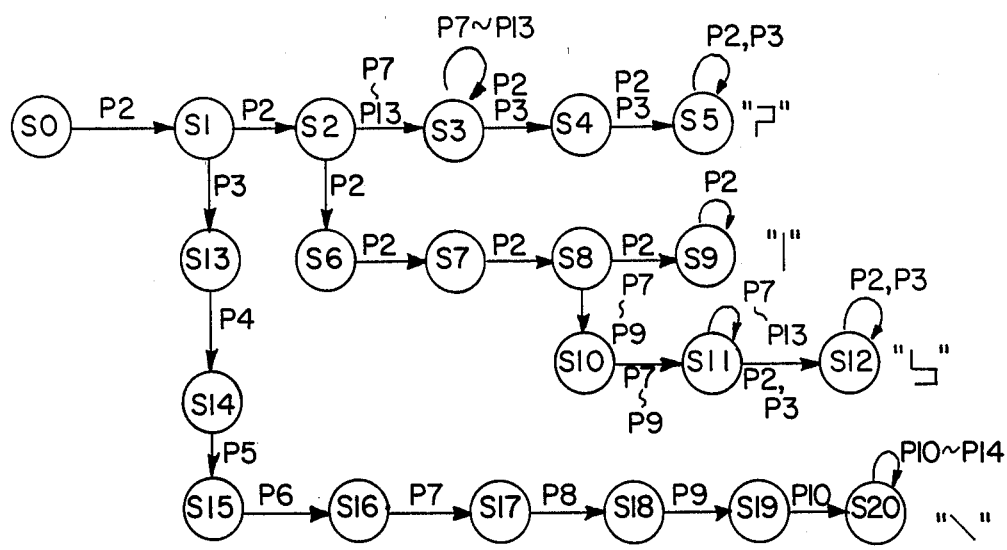
FIG. 4 is a flow diagram illustrating the transitional states for recognizing a frame of a character using the method and apparatus employed in the present invention.

The left-side character-frame recognizing circuit 23 receives the left-margin signals Pi from circuit 21, and recognizes a frame feature for the left side of the pattern. The frame recognition circuitry, which can consist of a ROM (read only memory) and a register, effects frame feature recognition by tracing the ordered sequence of the left-margin signals Pi. A transition flow diagram illustrating the process of recognizing a left-side frame feature of the pattern by circuit 23 is shown in FIG. 4.

In the figure, S0, S1, ... etc. are states of transition in the process of recognizing a left-side character frame feature, and P2, P3, ... etc. are signals Pi corresponding to the photocells in which left-margin line segments of the binary pattern are detected. For example, a recognition sequence is initiated at S0 and moves to S1 when P2 is inputted indicating a left-margin line segment detected in the photocell located in column B2 of the first line of the two-dimensional array of photocells. In the same manner, when subsequent signals Pi are inputted in the order of P2, P2, P8, P8, P8, P2, P2, then the states of transition follow in the order of S0, S1, S2, S3, S4, and finally lead to S5. As the final recognition result in this state corresponds to a frame feature defined as " ⊐ ", the left side frame of the pattern is determined to this frame feature.

Figure 5:
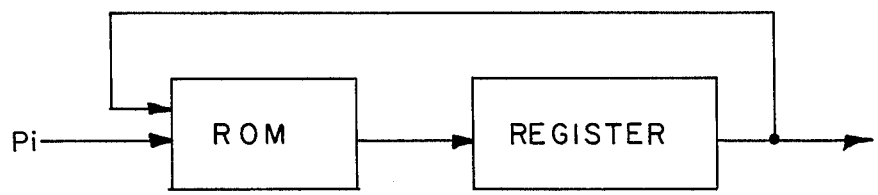
FIG. 5 shows a detailed block diagram for a character-frame recognizing circuit in the apparatus of FIG. 3.

FIG. 5 illustrates an example of the recognition circuit 23 for recognizing the above-described pattern frame features. The circuit is composed of ROM 30 and a register 31. Both the input signal Pi from the left-margin detector circuit 21 and the prior state output signal of the register 31 are introduced to ROM 30 as address signals, and the corresponding read-out state signal is then set in register 31. For example, in the initial state S0, the contents of register 31 are cleared, and when signal P2 is inputted to ROM 30 as an address signal, the transition state S1 is read out from ROM 30 and stored in register 31. The same procedure is then repeated until the final stage S5 is reached. The other (right) side frame recognition circuit 24 for the right side of the pattern operates in a similar manner as described above.

For right side frame recognition, right-margin detecting circuit 22 detects the presence of pattern segments on the lines on the right margin of the character area, and provides output signals Qi indicating the photocells where a right-margin pattern segment of the binary character pattern appears. For the pattern illustrated in FIG. 2, the signal Qi corresponds to the photocell on column Bi-1 on line Lj. Right-side character frame recognizing circuit 24 works similarly to the left-side recognizing circuit 23, by distinguishing the right side frame feature of the character pattern from signals Qi. A character-frame discrimination circuit 25 combines the results obtained from circuits 23 and 24, and thus determines the whole frame construction of the character.

Figure 6:
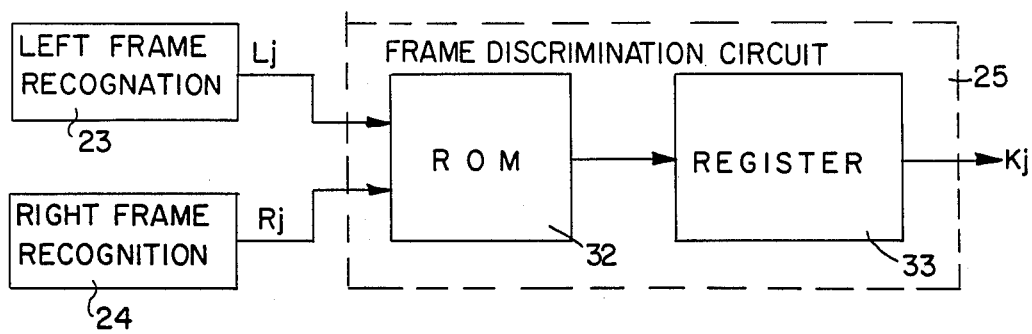
FIG. 6 is a block diagram of the frame discrimination means.

Referring to FIG. 6, the circuit 25 consists of a ROM 32 and a register 33. A frame feature code signal Lj from the left-side character-frame recognizing circuit 23 and another frame feature code Rj from the right-side are used as address signals to ROM 32, and the resulting integrated signal Kj is set in register 33. For example, in the case of recognizing the character "8", a code 02 is allocated when Lj corresponds to the left-side character-frame " ε ", and another code 04 is assigned for the right-side character-frame "3". The resulting signal from ROM 32 with an address of 0204 corresponds to "ε3" and the output signal Kj is 03.

From the output signals of both the character recognizing circuit 13 and the character-frame discrimination circuit 25, the final recognition result is determined by character discrimination synthesis circuit 26. To illustrate, in the case of distinguishing the characters "8" and "B", conventional recognizing circuit 13 may output the same results for the two. The output signals from the frame discrimination circuit 25, however, are different, since the left-side feature of the character-frame of "8" is " ε ", and the opposite side feature is determined as "3". On the other hand, the left-side feature of character "B" is determined to be "|", and the opposite-side feature is determined to be "3". The whole character frames of "8" and "B" are distinguished by the output Kj of circuit 25 for the respective two frame halves.

Figure 7:
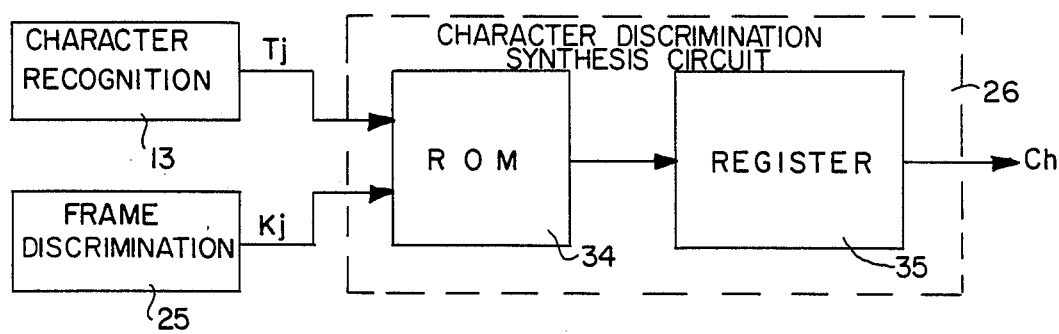
FIG. 7 is a block diagram showing the character synthesis means.

Referring to FIG. 7, the circuit 26 consists of a ROM 34 and a register 35. An output signal Tj from character recognizing circuit 13 and character-frame discrimination signal Kj are used as addresses to ROM 34, and the output Ch is registered in a register 35. To illustrate, in the case when the output signal from the circuit 13 is 08 corresponding to tbe character recognition results "ε3 ", and the character-frame discrimination signal is 03 corresponding to the recognition results of character-frame discrimination circuit 25, a code 0803 is used as the address signal for ROM 34, and a signal Ch which corresponds to the character "8" is outputted as a final recognized character code.

On the other hand, the character "B" is addressed by a code 0804 wherein Tj is 08 and Kj is 04, and ROM 34 provides a final code signal which corresponds to the recognized alphanumeric character "B".

Thus the apparatus and method of character recognition of the present invention enables distinguishing "8" from "B" or "K" from "X" by incorporating the additional functions of frame discrimination circuit 25 and character discrimination synthesis circuit 26 together with the conventional character recognizing functions of a scanner unit.

Figure 8:
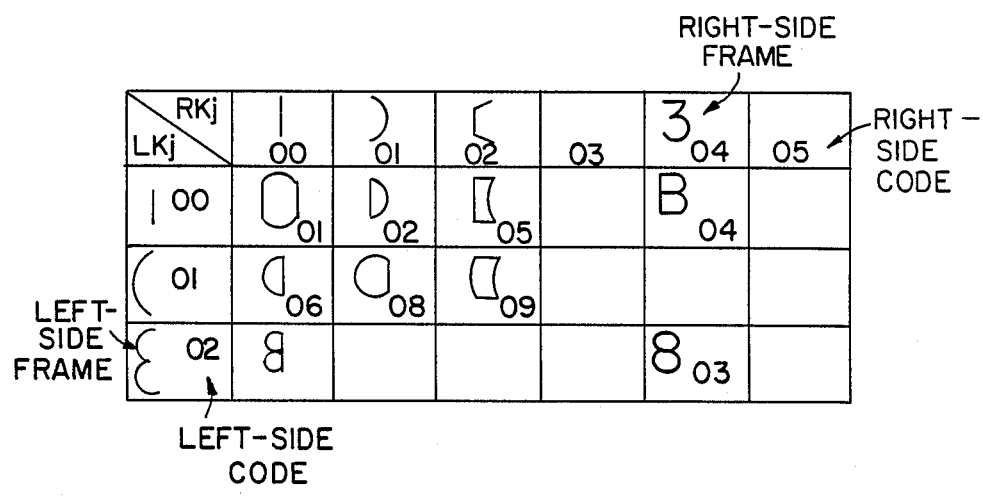
FIG. 8 is a tabular representation of character synthesis.

FIG. 8 explains the character synthesis further. RKj is shown horizontally and LKj is shown vertically. The points at which the horizontals and the verticals cross correspond to the synthesis results. For example, if LKj is 00, which is the code for the character "1", and RKj is 04, which is the code of the character "3", the result Kj is the code 04, which represents the character "B".

In the above-described embodiments of the invention, the left and right side margins of a binary character pattern are detected for every line segment of the pattern. In practice, margins can also be detected for every column (top and bottom frames) or for a plurality of lines and/or columns or combinations thereof. It is to be understood that other variations or further modifications may be made such as would be apparent to those skilled in the art without departing from the principles of the invention. All such modifications and variations are intended to be encompassed within the scope of the invention, as defined in the appended claims:

What is claimed:

1. In an apparatus for recognizing a character with a hand held scanner having an image sensor composed of a two-dimensional array of photoelectric elements, projection lamps, a focusing lens, and a binary conversion circuit for converting output analog signals of the photoelectric elements into digital signals to form a binary pattern of the character scanned, wherein the binary pattern of the character scanned is defined in a rectangular character area of rows and columns of cells in which digital bits representing the character scanned occur or do not occur, and said apparatus including character area determining means for determining the character area by identifying the rows and columns of cells having digital bits representing the character scanned, and character recognition means for abstracting the presence of absence of digital bits on each line of the identified rows or columns of the character area into a set of line features, identifying the set of abstracted line features of the scanned character within the character area, and producing a character recognition result therefrom, the improvement comprising:

character margin detection means, receiving the outputs from said binary conversion circuit and said character area determining means, for detecting the presence or absence of digital bits occurring in at least one line proximate each of a left side margin and a right aide margin of the character area, and providing left and right side margin output signals indicative of the detected digital bits in each respective line of the left and right side margins;

character frame recognizing means receiving the output signals from said character margin detection means for recognizing a left side frame structure, from the output signals for the detected line of the left side margin, and a right side frame structure, from the output signals for the detected line of the right side margin, based upon an order of occurrence of said left and right side margin output signals of said character margin detection means; and character discrimination synthesis means receiving a character recognition output from said character recognition means and a left and right side frame structure output from said character frame recognizing means for synthesizing the results of said character recognition means and of said character frame recognizing means so as to discriminate between similarly shaped characters on the basis of differences detected in their left and right side margins and to provide a final character identification based thereon.

2. The character recognition apparatus of claim 1, wherein said character frame recognizing means includes left and right side frame recognizing means for recognizing left and right side frame features in response to the orders of occurrence of said left and right side margin output signals, respectively.

3. The character recognition apparatus of claim 2, wherein said character frame recognizing means further comprises character frame discrimination means for discriminating a single frame construction for the binary pattern in response to said recognized left and right side frame features.

4. The character recognition apparatus of claim 1, wherein said character recognition means comprises character area determination means for determining the character area of the binary pattern of the scanned character through vertical and horizontal segmentation of the binary pattern, character segment feature extraction means for extracting character segment features of rows or columns of the binary pattern and for providing a feature code for each row or column segment feature, partial character feature extracting means for compressing said character segment feature codes into partial character feature codes, and character determination means for determining an identity of the character according to the said partial character feature codes.

5. The character recognition apparatus of claim 1, wherein said character frame recognizing means comprises a read only memory and a register, the content of the read only memory being read out to the register in response to address inputs, and an output signal of the register and said margin output signals of said character margin detection means constituting said address inputs to said read only memory.

6. The character recognition apparatus of claim 1, wherein said character recognition means includes character area determination means for determining the character area for the binary pattern of the scanned character by providing segmentations of the rows and columns of the binary pattern, and further wherein said character frame recognizing means recognizes the character frame feature from said margin output signals within said row segmentation and column segmentation.

7. The character recognition method of claim 1, wherein said step of providing margin output signals includes providing left and right side margin output signals from left and right side margin detecting means, respectively.

8. The character recognition method of claim 7, wherein said step of recognizing a frame feature includes recognizing left and right side frame features of the binary pattern by left and right side frame recognizing means in response to the orders of occurrence of said left and right side margin output signals of said left and right side margin detecting means, respectively.

9. The character recognition method of claim 8, further comprising the step of recognizing a single frame construction for the binary pattern by combining the left and right side frame features by character frame discrimination means.

10. The character recognition apparatus of claim 1, wherein at least said image sensor, projection lamps, and focusing lens are incorporated in a hand held scanner unit.

11. In a method for recognizing a character by scanning with a hand held scanner having an image sensor composed of a two-dimensional array of photoelectric elements, projection lamps, a focusing lens, and a binary conversion circuit which converts output analog signals of the photoelectric elements into digital signals to form a binary pattern of the character scanned, wherein the binary pattern of the character scanned is defined in a rectangular character area of rows and columns of cells in which digital bits representing the character scanned occur or do not occur, and by determining the character area by character area determining means for identifying the rows and columns of cells having digital bits representing the character scanned, and by processing the binary pattern with character recognition means for identifying line features on each line of the scanned character within said character area and producing a character recognition result, the improvement comprising:

receiving the outputs from said binary conversion circuit and said character area determining means, detecting by character margin detection means the presence or absence of digital bits occurring in at least one line proximate each of a left side margin and a right side margin of the character area, and providing left and right side margin output signals indicative of the detected digital bits in each respective line of the left and right side margins within said character area;

receiving the output signals from said character margin detection means, and recognizing a left side frame structure, from the output signals for the detected line of the left side margin, and a right side frame structure, from the output signals for the detected line of the right side margin, by character frame recognizing means in response to an order of occurrence of said left and right side margin output signals of said character margin detection means; and receiving a character recognition output from said character recognition means and a left and right side frame structure output from said character frame recognizing means, and synthesizing by character discrimination synthesis means the results of said character recognition means and of said character frame recognizing means so as to discriminate between similarly shaped characters on the basis of differences detected in their left and right side margins and to provide a final character identification based thereon.

12. The character recognition method of claim 11, wherein said step of processing the binary pattern with character recognition means includes the steps of:

determining the character area of the binary pattern of the scanned character through vertical and horizontal segmentation of the binary pattern;

extracting character segment features for the rows or columns of the binary pattern and providing corresponding feature codes for the row or column segment features;

extracting partial character features by compressing said character segment feature codes into partial character feature codes; and determining an identity of the character by character determination means in accordance with the occurrence of said partial character feature codes.

13. The character recognition method of claim 11, wherein said step of recognizing a frame feature of the binary pattern is obtained by said character frame recognizing means being comprised of a read only memory and the register in which the content of the read only memory is read out to the register in accordance with address inputs, and an output signal of the register and said margin output signals of said character margin detection means constitute the address inputs to said read only memory.

14. The character recognition method of claim 11, wherein said margin output signals of said character margin detection means represent an adjacent plurality of segments of the binary pattern.

15. The character recognition method of claim 11, wherein said step of processing the binary pattern with character recognition means includes determining a character area of the binary pattern of the character scanned through row segmentation and column segmentation, and said steps of providing margin output signals and recogniznng a frame feature are obtained within said row segmentation and column segmentation.

16. The character recognition method of claim 11, wherein said frame feature includes frame features of left and right sides and of top and bottom sides of the binary pattern.

17. The character recognition method of claim 11, wherein said frame feature includes frame features of left and right sides and a top side of the binary pattern.

18. The character recognition method of claim 11, wherein said frame feature includes frame features of left and right sides of the binary pattern.

* * * * *